(12) United States Patent
Dieffenderfer et al.

(10) Patent No.: US 9,710,269 B2
(45) Date of Patent: Jul. 18, 2017

(54) EARLY CONDITIONAL SELECTION OF AN OPERAND

(75) Inventors: James Norris Dieffenderfer, Apex, NC (US); Jeffrey Todd Bridges, Raleigh, NC (US); Michael Scott McIlvaine, Raleigh, NC (US); Thomas Andrew Sartorius, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 658 days.

(21) Appl. No.: 11/336,357

(22) Filed: Jan. 20, 2006

(65) Prior Publication Data

US 2007/0174592 A1    Jul. 26, 2007

(51) Int. Cl.
  *G06F 9/30*     (2006.01)

(52) U.S. Cl.
  CPC ........ *G06F 9/30072* (2013.01); *G06F 9/3016* (2013.01); *G06F 9/30036* (2013.01); *G06F 9/30094* (2013.01); *G06F 9/30167* (2013.01)

(58) Field of Classification Search
  CPC ............. G06F 9/30072; G06F 9/30036; G06F 9/30094; G06F 9/3016; G06F 9/30167
  USPC ........................................................ 712/220
  See application file for complete search history.

(56) References Cited

U.S. PATENT DOCUMENTS 5,150,469 A    9/1992   Jouppi
5,699,537 A *  12/1997  Sharangpani et al. ........ 712/217
5,812,836 A *  9/1998   Bates et al. .................... 712/220
6,173,393 B1   1/2001   Palanca et al.
6,427,205 B1   7/2002   Mori et al.

(Continued)

FOREIGN PATENT DOCUMENTS

JP    2289096 A    11/1990
JP    4220722      8/1992

(Continued)

OTHER PUBLICATIONS

Rick L. Vinyard, Jr., "Predication", last updated Apr. 25, 2000, New Mexico State University, http://www.cs.nmsu.edu/~rvinyard/itanium/predication.htm.*

(Continued)

*Primary Examiner* — Henry Tsai
*Assistant Examiner* — John Roche
(74) *Attorney, Agent, or Firm* — QUALCOMM Incorporated (57) ABSTRACT

Delays due to waiting for operands that will not be used by a select operand instruction, are alleviated based on an early recognition that such operand data is not required in order to complete the processing of the select operand instruction. At appropriate points prior to execution, determinations are made regarding a selection criterion or criteria specified by the select operand instruction, conditions that affect the selection criteria, and the availability of operands. A hold circuit uses the determinations to control the activation and release of a hold signal that controls processor pipeline stalls. A stall required to wait for operand data is skipped or a stall is terminated early, if the selected operand is available even though the other operand, that will not be used, is not available. A stall due to waiting for operands is maintained until the selection criteria is met and the selected operand is fetched and made available.

28 Claims, 6 Drawing Sheets

(56) References Cited

U.S. PATENT DOCUMENTS

| | | | |
|---|---|---|---|
| 6,633,971 B2* | 10/2003 | Peng et al. | 712/218 |
| 2003/0191928 A1* | 10/2003 | Sheaffer | 712/236 |
| 2004/0111587 A1* | 6/2004 | Nair et al. | 712/34 |
| 2005/0125636 A1 | 6/2005 | Ford et al. | |
| 2005/0188182 A1* | 8/2005 | Hoyle et al. | 712/224 |
| 2005/0188187 A1* | 8/2005 | Sunayama et al. | 712/239 |

FOREIGN PATENT DOCUMENTS

| | | |
|---|---|---|
| JP | 08063353 | 3/1996 |
| JP | 2000020309 A | 1/2000 |
| JP | 2001051845 A | 2/2001 |
| JP | 2001501755 A | 2/2001 |
| JP | 2001505679 A | 4/2001 |
| JP | 2001209538 A | 8/2001 |
| JP | 2001216275 A | 8/2001 |
| JP | 2004062401 A | 2/2004 |
| JP | 2005174298 A | 6/2005 |
| WO | 9812626 A1 | 3/1998 |
| WO | WO9812625 A1 | 3/1998 |
| WO | 0242907 | 5/2002 |
| WO | WO 02/42907 A2 * | 5/2002 ............... G06F 9/38 |

OTHER PUBLICATIONS

Joseph C.H. Park, Mike Schlansker, "On Predicated Execution", May 1991, Hewlett Packard, 26 pages.*
International Search Report—PCT/US07/060814, International Search Authority—European Patent Office—Oct. 19, 2007.
Written Opinion—PCT/US07/060814, International Search Authority—European Patent Authority—Oct. 19, 2007.
European Search Report—EP11196175, Search Authority—Munich Patent Office—Jul. 5, 2012.

* cited by examiner

|     | OPERANDB      | OPERANDA      | CRITERIA=SELECT A   | FETCH | STALL |
| --- | ------------- | ------------- | ------------------- | ----- | ----- |
| 271 | NOT AVAILABLE | NOT AVAILABLE | NOT AVAILABLE       | A & B | YES   |
| 272 | NOT AVAILABLE | NOT AVAILABLE | AVAILABLE(SELECT A) | A     | YES   |
| 273 | NOT AVAILABLE | AVAILABLE     | NOT AVAILABLE       | B     | YES   |
| 274 | NOT AVAILABLE | AVAILABLE     | AVAILABLE(SELECT A) | -     | NO    |
| 275 | AVAILABLE     | NOT AVAILABLE | NOT AVAILABLE       | A     | YES   |
| 276 | AVAILABLE     | NOT AVAILABLE | AVAILABLE(SELECT A) | A     | YES   |
| 277 | AVAILABLE     | AVAILABLE     | NOT AVAILABLE       | -     | YES   |
| 278 | AVAILABLE     | AVAILABLE     | AVAILABLE(SELECT A) | -     | NO    |

EARLY CONDITIONAL SELECTION OF AN OPERAND

FIELD

The present disclosure relates generally to techniques for processing instructions in a processor pipeline and, more specifically, to the early conditional selection of an operand from a plurality of operands based on a condition set by a previous instruction operating in a pipelined processor.

BACKGROUND

Commonly portable products, such as cell phones, laptop computers, personal data assistants (PDAs) or the like, require the use of a processor executing a program supporting communication and multimedia applications. The processing system for such products includes a processor, a source of instructions, a source of input operands, and storage space for storing results of execution. For example, the instructions and input operands may be stored in a hierarchical memory configuration consisting of general purpose registers and multi-levels of caches, including, for example, an instruction cache, a data cache, and system memory.

In order to provide high performance in the execution of programs, a processor typically executes instructions in a pipeline optimized for the application and the process technology used to manufacture the processor. In high performance processors, the rate of accessing operands from storage tends to be slower than the processor instruction execution rate. Consequently, obtaining instruction specified operands from storage, may result in stalling the processor for one or more cycles to account for differences in storage access time and the processor clock cycle time. Further, it often occurs that an instruction specifies a source operand that is a result of executing a previous instruction. In multiple stage execution pipelines, the instruction requiring a previous execution result must be stalled, pending the completion of executing the previous instruction. These stalls limit the performance of the processor.

SUMMARY

Among its several aspects, the present disclosure recognizes that it is commonly advantageous to minimize the number of stalls that may occur when executing instructions. Accordingly it may be desirable to implement select operand instructions that minimize stalls and aid in avoiding or minimizing the use of branch instructions in programs such as programs supporting communication and multimedia applications. Such improvements to a processor provide for improved performance and efficiency of operating the processor.

An embodiment of the disclosure applies to a method of pipeline operations. The method involves detecting an instruction that specifies at least one operand to be selected from a group of at least two operands, at least one of which may be in flight in the pipeline. A further step follows to determine an operand selection criterion that is specified by the instruction. Once the selection criterion is determined, it is then evaluated to select at least one operand from the group of at least two operands. The instruction may then be committed for execution once the at least one selected operand is available without waiting for a non-selected operand to become available.

Another aspect of the disclosure addresses an apparatus for processing instructions in a pipelined processor. The apparatus includes an execution stage for executing instructions using input operand data required by each instruction of a plurality of instructions. A hold circuit is used that generates a hold for each instruction until all input operand data is received thereby completing the hold. The apparatus also includes means for determining, prior to completion of receiving the input operand data, an operand data to select and terminating the hold with respect to a selection criteria specified in an instruction in execution upon determining the selected operand data is available A more complete understanding of the inventive concepts disclosed herein, as well as further features, will be apparent from the following Detailed Description and the accompanying drawings.

DETAILED DESCRIPTION

The present disclosure will now be described more fully with reference to the accompanying drawings, in which several embodiments of the disclosure are shown. This disclosure may, however, be embodied in various forms and should not be construed as limited to the embodiments set forth herein. Rather, these embodiments are provided so that this disclosure will be thorough and complete, and will fully convey the scope of the disclosure to those skilled in the art.

Computer program code or "program code" for being operated upon or for carrying out operations according to the teachings of the disclosure may be initially written in a high level programming language such as C, C++, JAVA®, Smalitalk, JavaScript®, Visual Basic®, TSQL, Perl, or in various other programming languages. A program written in one of these languages is compiled to a target processor architecture converting the high level program code into a native assembler program. Programs for the target processor architecture may also be written directly in the native assembler language. A native assembler program uses instruction mnemonic representations of machine level binary instructions. Program code or computer readable medium as used herein refers to machine language code such as object code whose format is understandable by a processor.

Figure 1:
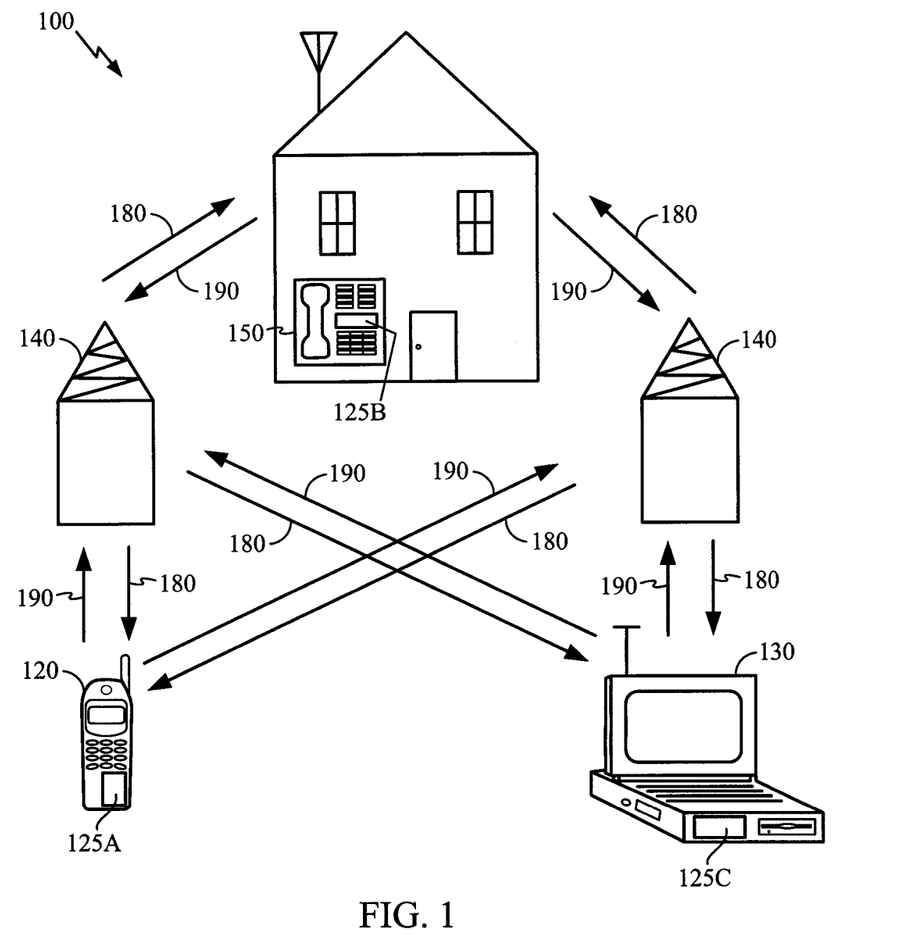
FIG. 1 is a block diagram of an exemplary wireless communication system in which an embodiment of the disclosure may be employed.

FIG. 1 is a block diagram of an exemplary wireless communication system 100 in which an embodiment of the disclosure may be employed. For purposes of illustration, FIG. 1 shows three remote units 120, 130, and 150 and two base stations 140. It will be recognized that commonly wireless communication systems may have additional remote units and base stations. Remote units 120, 130, and 150 include hardware components 125A, 125B, and 125C, respectively, having a processor for executing program code and operating in accordance with the present disclosure. FIG. 1 shows forward link signals 180 from the base stations 140 to the remote units 120, 130, and 150, and a reverse link signals 190 from the remote units 120, 130, and 150 to base stations 140.

In FIG. 1, remote unit 120 is shown as a mobile telephone, remote unit 130 is shown as a portable computer, and remote unit 150 is shown as a fixed location remote unit in a wireless local loop system. For example, the remote units may be hand-held personal communication systems (PCS) units, portable data units such as personal data assistants, or fixed location data units such as meter reading equipment. Although FIG. 1 illustrates remote units according to the teachings of the disclosure, the disclosure is not limited to these exemplary illustrated units. For example, improved efficiency of processing is, in general, a desirable characteristic not only for remote devices, as illustrated, but for the majority of products having internal processors. Improvements in efficiently executing instructions may be obtained in a pipelined processor by having instructions where a source operand is conditionally selected in accordance with the present disclosure.

A processor typically uses a diverse set of instructions that operate on instruction specified operands. Load, store, add, multiply, shift, select, AND, and OR instructions are examples of instructions that may be provided in an instruction set architecture. A select instruction is an example of an instruction where an operand may be conditionally selected from a choice of two or more operands and the selected operand stored to a target register address. In order to efficiently execute a select instruction, the determination of which operand to select and the fetch operation are processed with a minimum of time lost due to processor stalls.

Figure 2A:
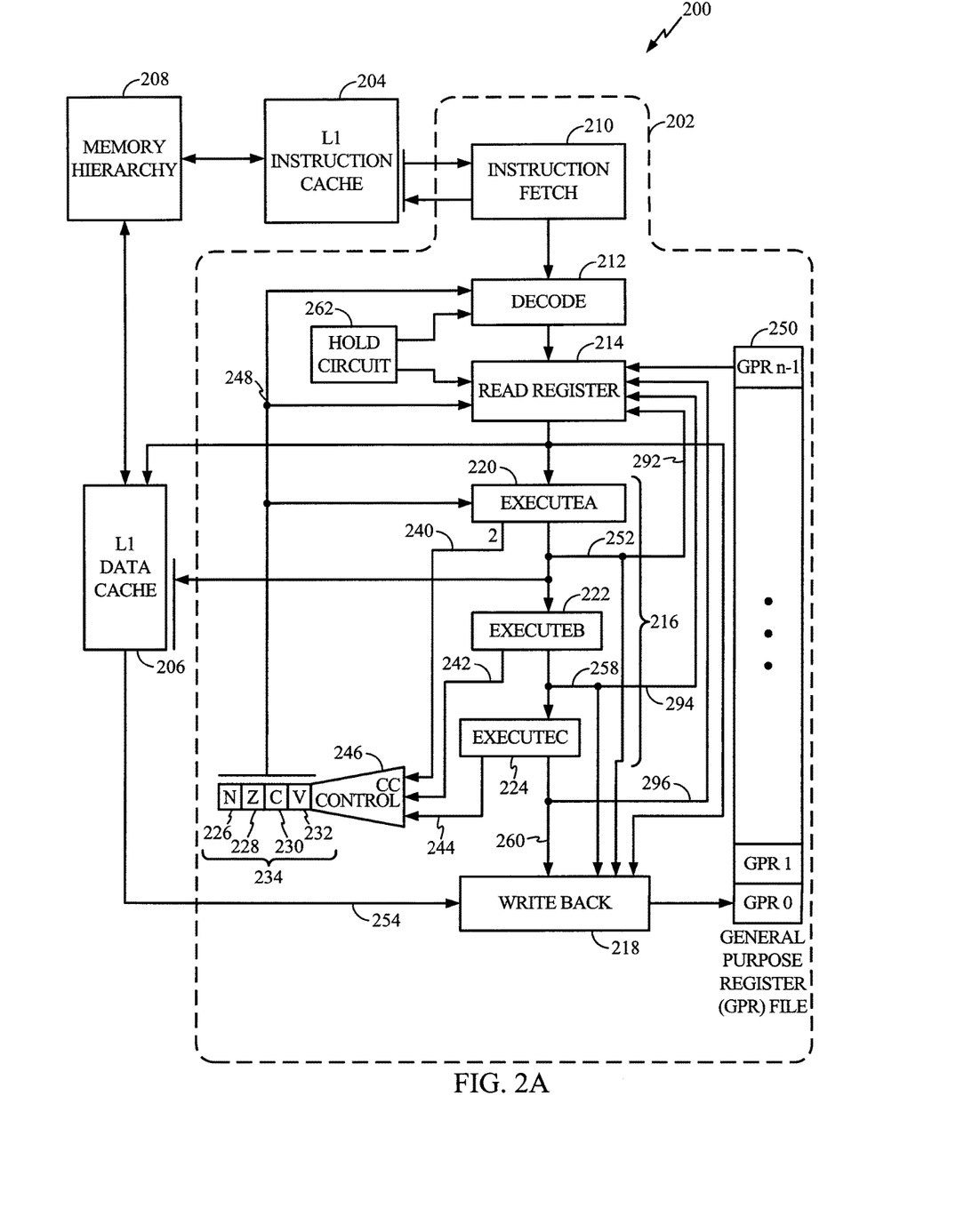
FIG. 2A is a functional block diagram of a pipelined processor complex in which a conditional selection of an operand function may be employed in accordance with a first embodiment of the present disclosure.

FIG. 2A is a functional block diagram of an exemplary pipelined processor complex 200, in which the conditional selection of an operand function may be employed. The processor complex 200 includes processor pipeline 202, L1 instruction cache 204, L1 data cache 206, and memory hierarchy 208. Peripheral devices which may connect to the processor complex are not shown for clarity of discussion. The processor complex 200, in accordance with a first embodiment of the present disclosure, may be suitably employed in hardware components 125A-125C for executing program code that is stored in the memory hierarchy 208.

The processor pipeline 202 includes five major stages, an instruction fetch stage 210, a decode stage 212, a read register stage 214, an execute stage 216, and a write back stage 218. Those skilled in the art will recognize that any of these stages may be partitioned into multiple stages performing portions of the relevant function, or that the pipeline may include other stages for providing additional functionality. For discussion purposes, several of the major stages are shown as single stages, although each may be partitioned into two or more stages for high speed designs. For example, the execute stage 216 is partitioned into three sub-stages, executeA 220, executeB 222 and executeC 224.

Though a single processor pipeline 202 is shown, the processing of instructions with conditionally selected operands is applicable to super scalar designs and other architectures implementing parallel pipelines. Processors supporting conditional selection of operand instructions in alternative implementations may have fewer or more stages than the processor pipeline 202. For example, a super scalar processor designed for high clock rates may have two or more parallel pipelines and each pipeline may divide the instruction fetch stage 210, decode stage 212, read register stage 214, executeA stage 220, executeB stage 222, executeC stage 224, and write back stage 218 into two or more pipelined stages increasing the overall processor pipeline depth in order to support the high clock rate.

In the processor pipeline 202, the first stage is an instruction fetch stage 210. The instruction fetch stage 210 fetches instructions from the L1 instruction cache 204 for processing by later stages. If an instruction fetch misses in the L1 instruction cache 204, the instruction is fetched from the memory hierarchy 208 which may include a level 2 (L2) cache and main memory. Instructions may be loaded to main memory from other sources, such as a boot read only memory (ROM), a hard drive, an optical disk, or from an external interface, such as, the Internet.

The instruction fetch stage 210 supplies each fetched instruction to the decode stage 212. The decode stage 212 decodes instructions into a collection of control bits that are supplied to the next stages of the pipeline and may support additional operations in decode pertinent to a fetched instruction's execution.

General forms of select operand type instructions may be employed and executed in processor pipeline 202, for example, to avoid branches and to manipulate data or merge data prior to processing as described further below. For example, load, store, arithmetic, logical, shift, compare, bit manipulation instructions and the like, may be augmented with the addition of an operand selection function to conditionally process the operand data. In a select operand load instruction and a select operand store instruction, a selection is made between at least two memory base addresses that are stored in a general purpose register (GPR) file and referenced as GPR register addresses. In a select add instruction, an operand is selected from a choice of at least two operands and the selected operand is added to another operand. In general forms of select operand instructions, one or a group of operands may be selected from a larger group of operands based on a selection criterion or criteria being met. The selected one or group of operands are supplied to an execution path for further processing as dictated by the select operand instruction. It is noted that one or more criterion may be employed as criteria for determining a selection. A subset of the general form of select operand type instructions is the select instruction, in which an operand is conditionally selected from two register operands and the selected operand stored to a target register address. Another form of a select operand instruction is an instruction that specifies a choice between a register operand and an immediate value.

Another example is a select operand instruction that is used to select a block of operands from a choice of two or more blocks of operands as might be used in a vector processor. Each block of operands is referenced by a field in the select operand instruction that contains a pointer to the start of the block. In addition, a general selection criteria may specify more than two choices such as may be obtained from a multiple bit selection criteria. The selection criteria may specify which operands are to be selected from the larger group, the number of operands to be selected, or other selection mechanism as specified by the processor's instruction set architecture.

The conditions used for determining operand selection may be developed from condition flags set by the processor in the execution of various arithmetic, logic, and other function instructions as typically specified in the instruction set architecture. For example, a negative (N) bit 226 indicates, for those instructions that affect the N bit, whether the result of execution is negative or not. A zero (Z) bit 228 indicates, for those instructions that affect the Z bit, whether the result of execution is all zeros. A carry (C) bit 230 indicates, for those instructions that affect the C bit, whether the result of execution involved a carry out. An overflow (V) bit 232 indicates, for those instructions that affect the V bit, whether the result of execution overflowed. These bits may be stored in a flag register or a condition code (CC) register 234 which may also be part of a program status register.

The condition code bits may be set by the various stages of execution but the program order of changing condition code bits is maintained. For example, certain operations such as addition, logic operations, bit selection, address generation, and the like may be accomplished in the executeA stage 220. These executeA stage 220 instructions may also be specified to affect the condition code register 234 and may send the affected condition code bits at the end of execution over path 240. More complex operations, such as specified in an arithmetic logic unit (ALU) operation with register shift instruction, may be split into two separate operation steps. A first operation step being accomplished in executeA stage 220 and the second operation step being accomplished in executeB stage 222. At the completion of the instruction execution in executeB stage 222, changes to the condition code register 234 may be sent over path 242. Operations which are of a more complex nature may take additional execution stages to accomplish. For example, a multiply instruction may take three stages, executeA stage 220, executeB stage 222, and executeC stage 224, to complete the multiply operation. At the completion of the third stage, condition code register 234 may again be affected by the appropriate bits sent through path 244. Since the instructions may complete in a different order than the program order, due to the variations in execution lengths, the bits in the condition code register 234 are set according to the program order. Facilities to control the setting of the condition register 234 bits are, for the sake of illustration, included in CC control logic 246.

The processing of a select operand instruction may begin in the decode stage 212. Rather than wait for all operands to be fetched before determining the operand selection criteria status, the decode stage determines the operand selection criteria first. In order to determine the operand selection criteria, the pipeline must be checked to determine whether there are any instructions already in the pipeline that may affect the operand selection criteria. Since an instruction that affects the condition code register may affect only one bit, all bits, or some combination of bits in the register, the operand selection criteria as specified by the select operand instruction is decoded to determine what combination of bits in the condition code register are required. For example, one operand may be selected if a previous result was zero with the Z bit 228 set and a different operand selected if the Z bit was not set. A more complex selection criteria, such as, selecting an operand if a previous calculation resulted in a positive nonzero result, could be obtained by checking both the N bit 226 and the Z bit 228 to see if they both are set to "0". The condition code register 234 values are forwarded over condition code (CC) path 248 to the decode stage 212, the read register stage 214, and the executeA stage 220 where the condition code bits may be monitored.

With a select operand instruction in the decode stage 212, there may be up to four additional instructions in the processor pipeline 202 ahead of it. Three of these four additional instructions may be in various stages of execution. If multiple execution stages are in operation at the same time with instructions that may affect the same condition code bit, the program order of execution dictates which instruction has priority in setting the condition code bit. The last instruction, prior to the select operand instruction, that affects the condition code bits that are used in the operand selection criteria is determined by a look ahead process.

The look ahead process also begins in decode with the control bits decoded from each instruction passing through the pipeline. A portion of the control bits indicate which condition bits, if any, an instruction is to affect. Each decoded instruction's control bits follow the instruction specified operations through the pipeline such that each pipeline stage may be checked to determine whether that operation stage is to affect the condition code register 234. As an example, a look ahead may operate as an OR of specific control bits in each pipeline execute stage. This approach is useful as a quick test for the case where no instruction in the pipeline execution stages affects the relevant condition bit or bits. Since the control bits are available for each execution stage of the pipeline, it can also be determined when the condition register may be affected.

If no instruction in the pipeline execution stages affects the relevant condition bit or bits, then there is sufficient information available to determine the operand selection criteria in the decode stage. Once it is determined which operand is to be selected, processing proceeds to the next read register stage 214 which is given control information to fetch only the selected operand.

If at least one instruction in the pipeline execution stages affects the relevant condition bit or bits, then processing proceeds to the next read register stage 214 which is given control information to fetch all operands required by the select operand instruction. The determination of the selection criteria is monitored while all operands are being fetched. It may be that the selection criteria is determined before all operands have been fetched which can be used to reduce the stall time, as described in further detail below.

The read register stage 214 fetches the operands required to be processed, such as, in the executeA stage 220. The operands may be fetched from a general purpose register (GPR) file 250 or from a forwarding network including 292, 294, and 296 connections. The forwarding network provides a fast path around the GPR file 250 to supply result operands as soon as they are available from the execution stages. Even with the forwarding network, result operands from a deep execution pipeline may take three cycles, as in the processor pipeline 202, or more than three cycles in an alternative implementation. During these cycles, an instruction in the read register stage 214 that requires result operand data from the execution pipeline, must wait until the result operand is available.

Another example of a stalling situation that must be accounted for occurs with the execution of a load instruction. The execution of a load instruction may take a significant number of cycles if there is a miss in the L1 data cache 206. A load instruction may use a GPR file 250 register to supply a base address and add an immediate value to the base address in the executeA stage 220 to generate an effective address. The effective address is sent over data path 252 to the L1 data cache 206. With a miss in the L1 data cache 206, the data must be fetched from the memory hierarchy 208 which may include an L2 cache and main memory. During the cycles it takes to fetch data after an L1 data cache miss, an instruction requiring the in flight load data as a source operand is stalled in the pipeline until the in flight operand is available. The stall may be considered to occur in the read register stage 214 or the beginning of the executeA stage 220. Upon resolution of the miss, the load data is forwarded over path 254 to a write back operation that may be considered to be part of the write back stage 218. The operand is then written to the GPR file and may also be sent to the forwarding network. The effect of a stall on the execution of a select operand instruction due to a load operation may be minimized, as discussed below.

It is noted that in some processor pipelines, the evaluation of the selection criteria may occur after a register file access has started. In this case, when it is determined that an operand is not needed and not yet received, the processing of the instruction stops tracking where the operand is in flight or the processor stops "listening" to the forwarding network for a tag that indicates the operand is available. This procedure is a more passive operation than a fetch operation. Either approach is operable within the teachings of the present disclosure.

Figure 2B:
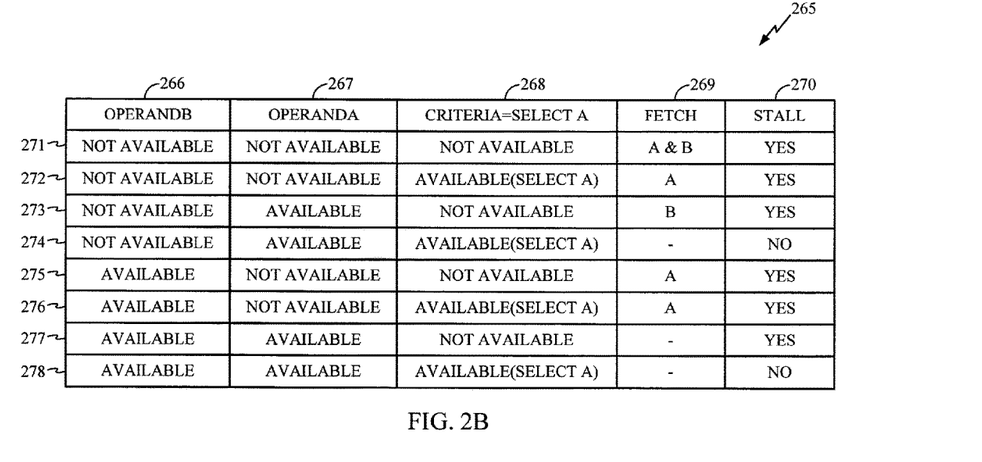
FIG. 2B is a decision table that identifies conditions for determining when to stall a processor pipeline prior to entering the processor's execution stages in accordance with the present disclosure.

FIG. 2B is an exemplary decision table 265 that identifies conditions for determining when to stall a processor pipeline prior to entering the processor's execution stages. The instruction in the pipeline being evaluated is a select operand instruction specifying a selection of one operand from two operand choices, operandA and operandB. The availability of operandB and operandA is shown in columns 266 and 267, respectively. Table 265 is based on a scenario that the selection criteria will be determined to select operandA. If an operand is indicated to be available, no additional cycles are required to obtain the operand. The status of the selection criteria is shown in column 268. Fetch operations, as shown in column 269, are designated to obtain one or both operands that are not available. Operands may be available without stalling the pipeline as provided by a forwarding network or from the GPR file. If the selection criteria can not be determined (not available), it is assumed to be due to at least one instruction in the pipeline that may affect the selection criteria. The pipeline is stalled if input to complete the execution, including operands and selection criteria, are not available, as shown in the stall column 270. General operating scenarios are indicated by rows of the table.

Row 271 indicates neither operandA nor operandB is available and that the selection criteria is also not available. The pipeline is stalled in the read operand stage while both operands are fetched and the selection criteria condition bit/s are monitored. Row 272 indicates the selection criteria is determined prior to both operands becoming available, in which case, it is known that operandB is not needed. If the fetch of operandB had started, for example, with the scenario of row 271, the fetch of operandB can be safely terminated. The pipeline is stalled in the read stage awaiting operandA to become available. If either operandA or operandB becomes available before the selection criteria is determined, as in scenarios of row 273 and 275, the processing stays stalled in the read stage awaiting the other operand to become available or the selection criteria to be determined as it may affect the operand fetch operations. If both operands are available or become available after a pipeline stall has started, but prior to the selection criteria being determined, as in scenario 277, the processing stays stalled in the read stage awaiting the selection criteria to be determined. If the selection criteria is determined after a read stall has started and operandA is available but operandB is not available, as in the scenario of row 274, the fetch of operandB is terminated and the processing proceeds through the execute stages. If the processing reached a scenario such as row 274 without stalling, no stall would be required in the read register stage since the inputs are available and the processing proceeds through the execute stages. If the selection criteria is determined after a read stall has started and operandB is available but operandA is not available, as in the scenario of row 276, the stall continues until operandA becomes available. If the processing reached a scenario such as row 276 without stalling, a stall would be required in the read register stage since operandA is not available. If both operands and the selection criteria are available, no pipeline stall is required and processing proceeds through the execution stages.

As taught herein, a select operand instruction beginning execution will skip a stall that would be required to wait for operand data or will result in an early termination of the stall, if the selected operand is available even though the other operand, that will not be used, is not available. A stall due to waiting for operands of the select operand instruction is maintained until the selection criteria is determined and the selected operand is fetched and made available.

Once the operands are available for processing, the execution stage is entered. For a select instruction that selects among two GPR file operands based on a selection criteria and stores the selected operand to a target GPR file address, the operation may bypass the execution stages and forward the selected operand to the write back stage 218 and the forwarding network. There is typically a result forwarding network, to forward the results of each execution stage to later instructions passing through the pipeline. For general select operand instructions, the selected operand is passed to the executeA stage 220 to begin the execution stage processing.

Each execute stage may complete the processing of an instruction or may only process a portion of the operations required depending upon the complexity of the instruction specified operation. As each execution stage completes its operation, the results may be sent directly to the write back stage 218. For example, if an instruction completes its specified operation at the end of executeA stage 220 the results are forwarded to the write back stage 218 over path 252. Likewise, instructions that complete their operations at the end of executeB stage 222 forward their results to the write back stage 218 over path 258 and those instructions that complete their operations at the end of executeC stage 224 forward their results to the write back stage 218 over path 260. The write back stage 218 writes the results back to a register in the GPR file 250. Since results may be received in the write back stage 218 out of order compared to the program order, the write back stage 218 uses processor facilities to preserve the program order when writing results to the GPR file 250.

With the use of packed data operations, the select operand type instruction may be extended by the use of additional flags. For example, a set of flags may be set on a byte basis in packed data operations, such as, greater than or equal (GE) flags, less than flags (LE), or other conditional indication (CI). In thirty-two bit data types, four CI flags could be used. In sixty-four bit data types, eight CI flags could be used.

Figure 2C:
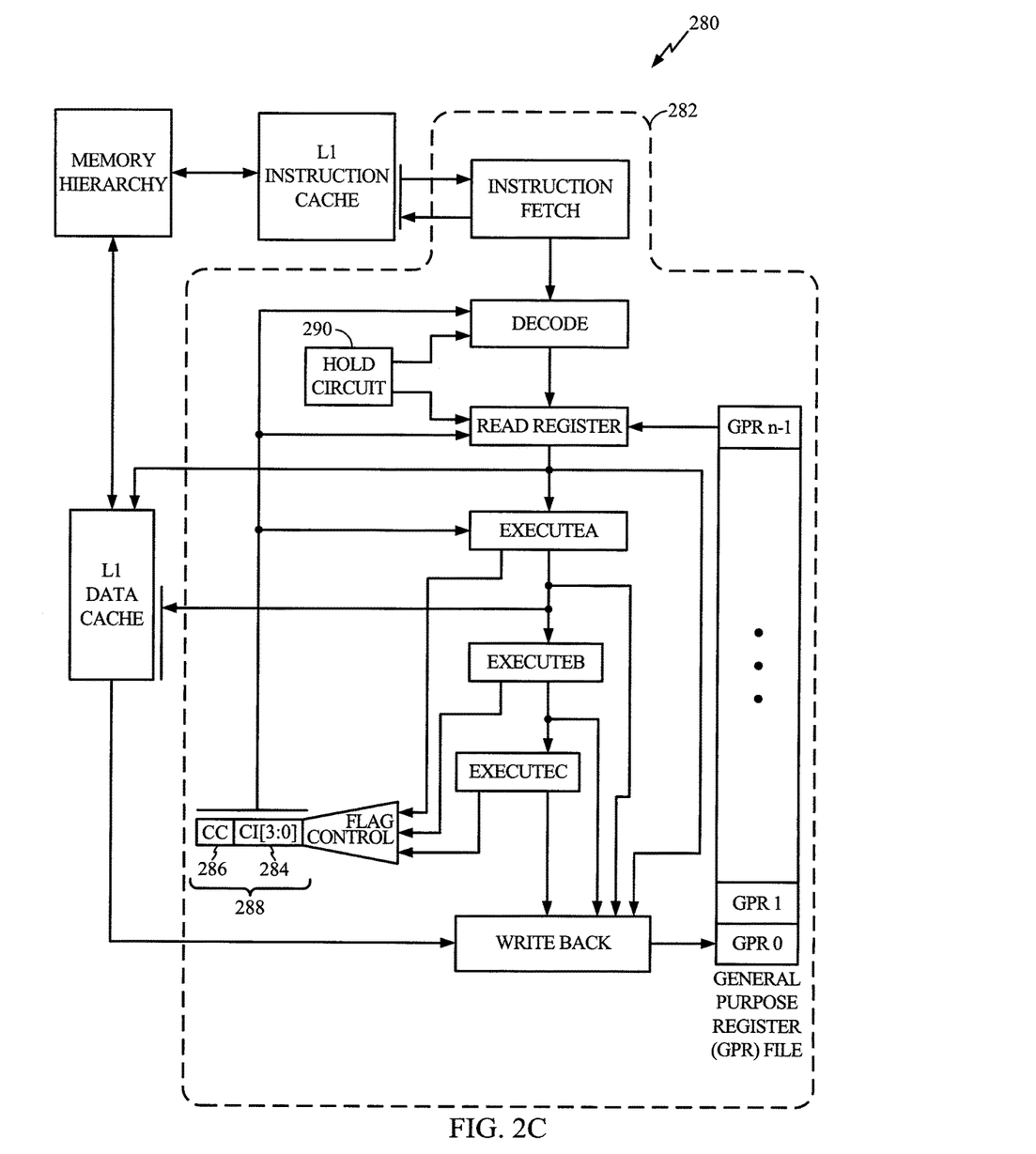
FIG. 2C is a functional block diagram of a pipelined processor complex in which a conditional selection of a packed data operand function may be employed in accordance with a second embodiment of the present disclosure.

FIG. 2C is a functional block diagram of a pipelined processor complex 280, in which a packed data select operand instruction may be employed in accordance with a second embodiment of the present disclosure. Pipeline processor 282 uses a selection criterion or criteria based on CI flags 284 supporting packed 32-bit operands. The CI flags 284 may be included along with the condition code register 286 as a combined CC/CI register 288 in a program status word.

A packed data select operand instruction may use CI flags to select bytes from two packed data operands. For example, a 32-bit packed data select instruction may be specified in the instruction set architecture to use the individual CI[3:0] flags that are ones to select a corresponding byte from operand A and if a zero to select a corresponding byte from operand B. A CI[3:0]=1010 would select byte 3 from operand A, byte 2 from operand B, byte 1 from operand A, and byte 0 from operand B to create a thirty two bit target register that contains the selected bytes. If CI[3:0]=1111 all bytes of operand A would be selected. If CI[3:0]=0000 all bytes of operand B would be selected. For the condition of CI[3:0]=1111, operand B is not required and need not be fetched. For the condition CI[3:0]=0000, operand A is not required and need not be fetched. The selection criteria is determined by the bit settings of the CI flags in the program status word. For the purpose of determining whether to fetch an operand or curtail the fetching of an operand, a selection criteria based on the CI flags being all ones or all zeros may be used.

A stall may be created in a processor pipeline by use of a hold circuit, such as hold circuit 262 of FIG. 2A and hold circuit 290 of FIG. 2C. The hold circuit generates a hold signal that may be used, for example, to gate pipeline stage registers to stall an instruction in a pipeline. For the processor pipeline 202 of FIG. 2A and pipeline 282 of FIG. 2C, a hold signal may be activated, for example, in the read register stage if not all inputs are available such that the pipeline is held pending the arrival of the inputs. The hold signal is released when all the operands become available and the selection criteria has been determined. The hold signal may suitably be activated and released according to operating scenarios, such as those specified, by way of example, in table 265 of FIG. 2B.

Processing of select operand instructions entails determining the instruction type and examining condition codes and flags, such as the CI flags, indicating condition and flag status to determine the selection criteria. An instruction may have a field in the instruction format that indicates it is a select operand instruction. The teachings of the disclosure are applicable to a variety of instruction formats and architectural specification.

Figure 3:
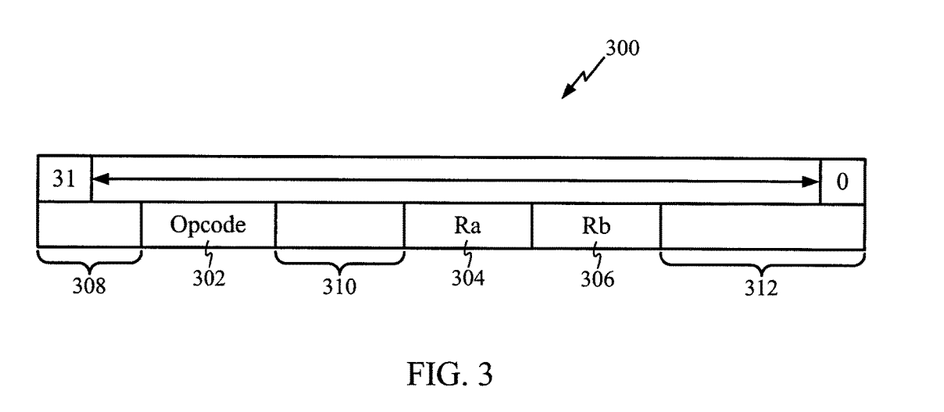
FIG. 3 is a graphical illustration of a general format for a 32-bit instruction that specifies a conditional operand selection function in accordance with the present disclosure.

FIG. 3 is a general format for of a 32-bit instruction 300 that specifies a conditional operand selection function in accordance with the teachings of the present disclosure. The select operand instruction 300 contains an opcode 302 that identifies the instruction as a select operand instruction and at least two source operand address fields, Ra 304 and Rb 306. The opcode 302 specifies both the selection criteria and the instruction operation such as an add, multiply, shift, logic, bit manipulation, and the like. Alternatively, a separate bit or bits may be specified in the instruction format to identify the instruction as a select operand instruction and the opcode used solely for the function specification. The other bit fields, 308, 310, and 312, may be instruction specific fields for uses, such as, a condition field for controlling whether to execute the instruction or not execute the instruction, a target register address field, data type, and the like.

Figure 4:
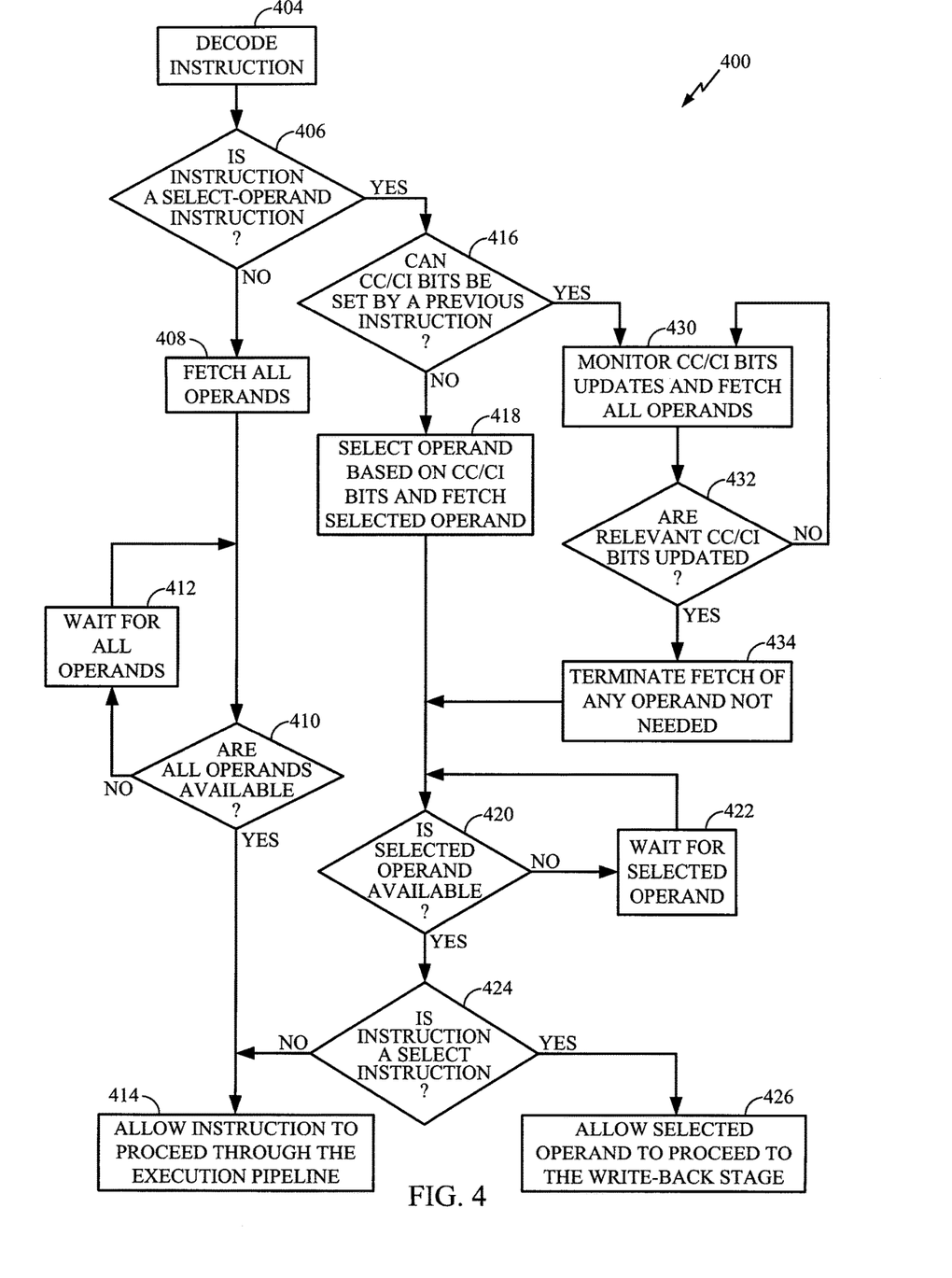
FIG. 4 is a flow chart of operational steps required to conditionally select an operand early in the pipeline in accordance with the present disclosure.

FIG. 4 is a flow chart 400 illustrating operational steps required to conditionally select an operand early in the processor pipeline. In step 404, a fetched instruction is decoded, in a decode stage, such as decode stage 212, for example. In step 406, it is determined whether the instruction is a select operand instruction. If the instruction is not a select operand instruction, the processing moves to step 408. At step 408, all of the operands are accessed to the read register stage 214 as appropriate, for example, from a general purpose register file, such as GPR file 250. If the operands are not immediately available as determined in step 410, the instruction must be stalled, as indicated in step 412, to wait for all of the operands. Once all operands are available as determined in step 410, the instruction is allowed to proceed through the execution pipeline in step 414, for example, starting in the execute1 stage 220 of FIG. 2A.

Consider another scenario in which a select operand instruction is fetched and decoded in step 404. In this case, at step 406 the fetched instruction is determined to be a select operand instruction and the processing moves to step 416. In step 416, a test is made to decide whether the operand selection criteria can be determined based on the current state of a condition code register, such as the CC register 234 of FIG. 2A or the CC/CI register 288 of FIG. 2C. The selection criteria may not be determined if a previous instruction or instructions in flight in the pipeline may affect the condition flags and consequently may affect the operand selection criteria. If the operand selection criteria can be determined based on the current state of the CC or CI registers, the processing moves to step 418. In step 418, the operand selected based on the selection criteria is fetched. Processing continues with step 420, reaching, for example, the read register stage 214. At step 420 it is determined whether the selected operand is available. If the selected operand is not immediately available, as determined in step 420, the instruction must be stalled, as indicated in step 422, to wait for the selected operand.

Once the selected operand is available as determined in step 420, the processing proceeds to step 424 which determines whether the instruction is a select instruction that is a subset of the general select operand instruction type or a general select operand instruction type. If the instruction is a select instruction, the processing proceeds to step 426 in which the execution stages, such as execution stages 216, are bypassed and the operand is forwarded to a write back stage, such as write back stage 218. The operand may also be sent to the forwarding network. If the instruction is a general select operand instruction, the processing proceeds to step 414, for example, by starting at execute1 stage 220.

A scenario may occur in which the test in step 416 determines that a previous instruction or instructions in flight in the pipeline may affect the CC registers 234 or the CC/CI register 288 and consequently may affect the operand selection criteria. In this case, processing proceeds to step 430 in which a process is started to fetch all operands and the condition flags are monitored for updates. A test is made in step 432 to determine whether all CC or CI bits relevant to determining the selection criteria have been updated. If the relevant CC or CI bits have not been updated, then the processing returns to step 430 and the fetch of all operands is continued. Once all relevant CC or CI bits have been update as determined in step 432, processing proceeds to step 434 in which the fetching of the operand not needed, as determined by the selection criteria, is stopped. Processing then proceeds to step 420 in which it is determined whether the selected operand is available. If not, the processing of the instruction must be stalled, as indicated in step 422, until it is determined that the selected operand is available.

Once the selected operand is available, processing proceeds to step 424 which determines whether the instruction is a select instruction that is a subset of the general select operand instruction type or a general select operand instruction type. If the instruction is a select instruction, processing proceeds to step 426 in which the execution stages, such as execution stages 216, are bypassed and the operand is forwarded to the write back stage, such as write back stage 218. The operand is also sent to the forwarding network. If the instruction is a general select operand instruction, then processing proceeds to step 414, for example, by starting at execute1 stage 220.

While the present disclosure has been disclosed in a presently preferred context, it will be recognized that the present teachings may be adapted to a variety of contexts consistent with this disclosure and the claims that follow.

We claim:

1. A method of pipeline operation of a processor, comprising:
    Initiating, by the processor, a fetch of a group of two operands specified in an instruction, wherein one operand is to be conditionally selected from the group of two operands based on an operand conditional selection criterion in the instruction that specifies a condition code, and the not selected one of the two operands is in flight in the pipeline and not available at the time the fetch is initiated;
    determining, by the processor, a value of the condition code affected by execution of a previous function instruction in an execution pipeline stage, that meets the operand conditional selection criterion, and in response selects the one operand from the group of two operands;
    executing, by the processor, the instruction once the one selected operand has been received; and
    terminating, by the processor, the fetch in effect for the operand from the group that is not selected before the non-selected operand becomes available.

2. The method of claim 1 further comprises:
    decoding the instruction to determine at least one condition flag that is used as the basis for the operand conditional selection criterion.

3. The method of claim 1 wherein the determining a value of the condition code further comprises:
    waiting for condition flags that are specified by the operand conditional selection criterion to be affected if the condition flags are specified by the previous function instruction still in execution.

4. The method of claim 1 wherein the determining a value of the condition code further comprises:
    looking ahead in a plurality of execution pipeline stages to check if at least one condition flag is affected as specified by the previous function instruction in execution.

5. The method of claim 1 wherein at least two operands are to be selected and wherein the group comprises at least three operands.

6. The method of claim 1 wherein the instruction specifies a function of the one selected operand.

7. The method of claim 6 wherein the function returns a calculated result based on the one selected operand.

8. The method of claim 1 wherein a block of at least two operands is to be selected from a group of blocks of operands wherein each block of operands has two or more operands.

9. The method of claim 1 wherein the operand conditional selection criterion is based on at least one packed data byte condition indication.

10. A method of processing a select operand instruction in a processor pipeline of a processor, the method comprising:
    decoding, by the processor, an operand conditional selection criterion specified in the select operand instruction in a decode stage of the processor pipeline;
    analyzing, by the processor, condition flags affected by a previous function instruction in a stage of execution of a plurality of stages of execution, wherein the condition flags are specified by the conditional selection criterion;
    if the analysis of the specified condition flags indicates that one operand of a group of at least two operands specified in the select operand instruction is to be selected, terminating, by the processor, any wait that is in effect for a non-selected operand; and
    executing, by the processor, the select operand instruction with the one selected operand.

11. The method of claim 10 wherein analyzing the condition flags further comprises:
    waiting for the condition flags specified by the conditional selection criteria to be affected if the condition flags are affected by the previous function instruction still in execution.

12. The method of claim 10 wherein the group of at least two operands comprises a register operand and an immediate value operand.

13. The method of claim 10 wherein executing the select operand instruction further comprises:
    returning a result that is a function of the one selected operand.

14. A pipelined processor for processing instructions, the pipelined processor comprising:
    an execution stage for executing an instruction that specifies one operand to be selected from a group of at least two operands specified in the instruction, using input operand data conditionally selected by evaluating a conditional selection criterion specified by the instruction;
    a hold circuit for generating a hold for the instruction, prior to execution thereof by the execution stage, until completion of receiving the conditionally selected input operand data for the instruction; and
    means for terminating the hold upon determining the conditionally selected input operand data is available without waiting for a non-selected operand from the group to become available.

15. The pipelined processor of claim 14 wherein terminating the hold further comprises terminating a fetch operation for the non-selected operand not necessary for the instruction to complete execution.

16. The pipelined processor of claim 14 further comprises:
    a decoder for decoding each instruction of a plurality of instructions into control bits including control bits that specify condition codes which represent the conditional selection criteria; and
    pipeline stages that track the control bits stage by stage through the pipeline.

17. The pipelined processor of claim 16 wherein the control bits are readable in each pipeline stage to determine if an execution stage affects the condition codes.

18. The pipelined processor of claim 14 wherein the instruction in execution comprises at least one bit field that specifies a select operand instruction and specifies the conditional selection criteria for selecting the one operand from a group of at least two operands and at least one bit field for each operand that is to be selected from.

19. The pipelined processor of claim 18 wherein the instruction further comprises a bit field that specifies a function of the selected one operand.

20. The pipelined processor of claim 18 wherein the at least one bit field for each operand is an address pointing to a block of operand data elements.

21. A pipelined processor, comprising:
means for initiating a fetch of a group of two operands specified in an instruction, wherein one operand is to be conditionally selected from the group of two operands based on an operand conditional selection criterion in the instruction that specifies a condition code, and the not selected one of the two operands is in flight in a pipeline and not available at the time the fetch is initiated;
means for determining a value of the condition code affected by execution of a previous function instruction in an execution pipeline stage, that meets the operand conditional selection criterion, and in response selects the one operand from the group of two operands;
means for executing the instruction once the one selected operand has been received; and
means for terminating any fetch in effect for the operand from the group that is not selected before the non-selected operand becomes available.

22. A pipelined processor, comprising:
means for decoding an operand conditional selection criterion specified in a select operand instruction in a decode stage of the pipelined processor;
means for analyzing condition flags affected by a previous function instruction in a stage of execution of a plurality of stages of execution, wherein the condition flags are specified by the conditional selection criterion;
means for if the analysis of the specified condition flags indicates that one operand of a group of at least two operands specified in the select operand instruction is to be selected, terminating any wait that is in effect for a non-selected operand; and
means for executing the select operand instruction with the one selected operand.

23. The method of claim 1, wherein the instruction requires less than all of the two operands among the group of two operands to be selected.

24. The method of claim 1, wherein the non-selected operand is not available at the time of committing the instruction for execution.

25. The method of claim 10, wherein the non-selected operand is not available at the time of executing the instruction.

26. The pipelined processor of claim 14, further comprising means for terminating the hold wherein the non-selected operand is not available.

27. A computer-readable non-transitory medium encoded with computer readable program data and code, the program data and code when executed operable to:
initiate a fetch of a group of two operands specified in an instruction, wherein one operand is to be conditionally selected from the group of two operands based on an operand conditional selection criterion in the instruction that specifies a condition code, and the not selected one of the two operands is in flight in a pipeline and not available at the time the fetch is initiated;
determine a value of the condition code affected by execution of a previous function instruction in an execution pipeline stage, that meets the operand conditional selection criterion, and in response selects the one operand from the group of two operands;
execute the instruction once the one selected operand has been received; and
terminate the fetch in effect for the operand from the group that is not selected before the non-selected operand becomes available.

28. The method of claim 10 further comprises:
if the analysis of the condition flags indicates bytes are to be combined from two source operands specified by the select operand instruction, bytes of a first source operand are selected based on a first state of bits in the condition flags and bytes of a second source operand are selected based on a second state of bits in the condition flags; and
combining the selected bytes of the first source operand with the selected bytes of the second source operand to create a conditional byte selected operand to be used in the execution of the select operand instruction.

* * * * *